United States Patent
Shiraishi

(10) Patent No.: US 9,896,288 B2
(45) Date of Patent: Feb. 20, 2018

(54) PAPER FEED APPARATUS AND IMAGE FORMING APPARATUS

(71) Applicant: Sharp Kabushiki Kaisha, Osaka (JP)

(72) Inventor: Yoshinori Shiraishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/046,035

(22) Filed: Feb. 17, 2016

(65) Prior Publication Data

US 2016/0362265 A1 Dec. 15, 2016

(30) Foreign Application Priority Data

Jun. 12, 2015 (JP) .................. 2015-119649

(51) Int. Cl.
*B65H 3/52* (2006.01)
*G03G 15/00* (2006.01)
*H04N 1/00* (2006.01)

(52) U.S. Cl.
CPC ......... *B65H 3/5223* (2013.01); *G03G 15/602* (2013.01); *H04N 1/00* (2013.01); *B65H 2402/31* (2013.01); *B65H 2402/543* (2013.01); *B65H 2403/60* (2013.01); *B65H 2515/82* (2013.01); *B65H 2601/524* (2013.01); *B65H 2801/39* (2013.01); *G03G 15/6511* (2013.01)

(58) Field of Classification Search
CPC ...... B65H 3/52; B65H 3/5207; B65H 3/5215; B65H 3/5223; B65H 2301/4234; B65H 2301/42342; B65H 2403/60; B65H 2515/82; B65H 2601/124; B65H 2601/125; B65H 2601/521; B65H 2601/524; B65H 2601/5242
USPC .................................. 271/121, 124
See application file for complete search history.

(56) References Cited

U.S. PATENT DOCUMENTS

| | | | | |
|---|---|---|---|---|
| 5,104,113 A | * | 4/1992 | Kameyama | B65H 3/5223 271/124 |
| 7,441,766 B2 | * | 10/2008 | Seki | B65H 3/5223 271/121 |
| 7,992,860 B2 | * | 8/2011 | Kimura | B65H 3/5223 271/121 |
| 8,695,964 B2 | * | 4/2014 | Hamaguchi | B65H 3/5223 271/121 |
| 2010/0127448 A1 | * | 5/2010 | Kuo | B65H 3/5223 271/10.09 |

FOREIGN PATENT DOCUMENTS

| | | |
|---|---|---|
| JP | 63-180638 A | 7/1988 |
| JP | 06-080266 A | 3/1994 |
| JP | 2007-197171 A | 8/2007 |

* cited by examiner

*Primary Examiner* — Ernesto Suarez
(74) *Attorney, Agent, or Firm* — Renner Otto Boisselle & Sklar, LLP

(57) ABSTRACT

A paper feed apparatus includes a paper feeding roller and a separating pad for separating paper one by one and feeding the paper. This separating pad is supported by a separating pad holder to be abutted onto the paper feeding roller with a predetermined pressure. Furthermore, the separating pad holder is provided with a weight member in a loosely-fitted state.

4 Claims, 7 Drawing Sheets

PAPER FEED APPARATUS AND IMAGE FORMING APPARATUS

CROSS REFERENCE OF RELATED APPLICATION

The disclosure of Japanese Patent Application No. 2015-119649 filed on Jun. 12, 2015 is incorporated herein by reference.

BACKGROUND OF THE INVENTION

Field of the Invention

The present invention relates to a paper feed apparatus and an image forming apparatus, and more specifically, a paper feed apparatus and an image forming apparatus, which separates paper placed in a paper placing tray one by one and feeds the paper.

Description of the Related Art

An example of a related art is disclosed in Japanese Patent Application Laying-open No. 2007-197171 [B65H 3/52] laid-open on Aug. 9, 2007 (Literature 1). A paper feed apparatus of Literature 1 is mounted with a sheet member separation apparatus comprising a paper feeding roller that feeds a sheet member, a holding arm (support member) having a friction pad (separating member) that separates the sheet member and a base member that is a base portion. This sheet member separation apparatus comprises a rotation holding portion that is constituted with a rotation shaft having a concentric cross-section that is tapered toward a shaft end portion and a concave rotation bearing portion that has a concentric cross-section that is tapered toward an inner portion and is to be fit to the rotation shaft. Then, the holding arm having the friction pad is sandwiched with pressure by this rotation holding portion.

In the structure that suppresses a minute vibration of the separating member (and support member) by sandwiching the support member of the separation member with pressured, it is necessary to make a pressure-sandwiching force by the rotation holding portion large to appropriately suppress the minute vibration of the separating member. However, since the rotation holding portion needs to hold the support member free rotation, there is a limit in enlarging the pressure-sandwiching force. Therefore, suppression of the minute vibration becomes insufficient with the technology of Literature 1, and therefore, there is a possibility the minute vibration of the separating member and a sound (vibration sound) accompanying the minute vibration cannot be adequately suppressed. Especially, since a frictional resistance becomes high when the paper feeding roller and the separating member rub directly in a state where there is no paper at the time of paper feeding, the minute vibration of the separating member is increased and a possibility that the sound may occur also becomes high.

SUMMARY OF THE INVENTION

Therefore, it is a primary object of the present invention to provide a novel paper feed apparatus and image forming apparatus.

It is another object of the present invention to provide a paper feed apparatus and image forming apparatus, capable of adequately suppressing a minute vibration of a separating member and a sound accompanying the minute vibration.

A first invention is a paper feed apparatus that feeds a paper placed in a paper placing tray, comprising: a paper feeding roller that feeds a paper; a separating member that separates a paper fed by the paper feeding roller one by one; a support member that supports the separating member to be abutted onto the paper feeding roller with a predetermined pressure; and a weight member that is provided to the support member in a loosely-fitted state.

In the first invention, the paper feed apparatus is an apparatus that feeds a paper placed in the paper placing tray, and is used in an image forming apparatus such as a copying machine, a facsimile, a printer, a multifunction machine compounding these, etc. The paper feed apparatus comprises the paper feed roller and the separating member for separating a paper one by one and feeding the paper. The separating member is a separating pad etc., and is supported by the support member to be abutted onto the paper feeding roller with the predetermined pressure. Then, this support member is provided with the weight member in the loosely-fitted state.

In such the paper feed apparatus, even if the separating member and the support member minute-vibrate at the time of paper feeding, the minute vibration of separating member can be attenuated promptly since the weight member in the loosely-fitted state moves out of synchronization with the support member. Furthermore, since it does not perform making the separating member into a low frictional resistance or decreasing an abutting pressure of the separating member against the paper feeding roller in order to suppress the minute vibration of the separating member, paper separation and feeding performance by the paper feeding roller and the separating member does not fall.

According to the first invention, it is possible to adequately suppress the minute vibration of separating member and the sound accompanying the minute vibration while keeping the paper separation and feeding performance with simple structure of providing the weight member to the support member of the separating member in a loosely-fitted state.

A second invention is according to the first invention, wherein the support member has a loosely-fitting shaft and two engaging portions that are provided at a predetermined interval in an axial direction of the loosely-fitting shaft, and the weight member has a loosely-fitting hole into which the loosely-fitting shaft is inserted.

In the second invention, the support member has the loosely-fitting shaft extending in a direction that is the same or approximately the same direction as a direction of the minute vibration of separating member, for example, and the two engaging portions provided at the predetermined interval in the axial direction of the loosely-fitting shaft. On the other hand, the weight member is formed with the loosely-fitting hole into which the loosely-fitting shaft is inserted. Then, by fitting the loosely-fitting shaft and the loosely-fitting hole to each other between the two engaging portions, the weight member is attached to the support member in the loosely-fitted state, whereby it is brought into a state where the weight member can move (minute-vibrate) in the direction of the minute vibration of separating member. Accordingly, the minute vibration of separating member and the sound accompanying it can be suppressed adequately.

A third invention is according to the first invention, wherein the support member has a loosely-fitting hole, and the weight member has a loosely-fitting shaft that is inserted into the loosely-fitting hole and two engaging portions provided at a predetermined interval in an axial direction of the loosely-fitting shaft.

In the third invention, the support member is formed with the loosely-fitting hole extending in a direction that is the same or approximately the same as the direction of the minute vibration of separation member, for example. On the other hand, the weight member is formed so as to have the loosely-fitting shaft that is inserted into the loosely-fitting hole and the two engaging portions provided at the predetermined interval in an axial direction of the loosely-fitting shaft. Then, by fitting the loosely-fitting shaft and the loosely-fitting hole to each other between the two engaging portions, the weight member is attached to the support member in the loosely-fitted state, whereby it is brought into a state where the weight member can move (minute-vibrate) in the direction of the minute vibration of separation member. Accordingly, the minute vibration of separating member and the sound accompanying it can be suppressed adequately.

A fourth invention is according to the first invention, wherein the support member is provided in a rockable manner with a support shaft that is provided in a position deviated from the separating member to an upstream side or a downstream side in a paper feeding direction as a fulcrum, and the weight member is arranged in a position near the separating member than the support shaft in the paper feeding direction.

In the fourth invention, the support member is provided in a rockable manner with the support shaft as a fulcrum and the separating member is provided in the position deviated from the support shaft to the upstream side or the downstream side in the paper feeding direction. Then, the weight member is arranged in the position near the separating member than the support shaft of the support member, that is, a position far from the support shaft.

According to the fourth invention, a minute vibration suppressing effect is shown more largely.

A fifth invention is a paper feed apparatus that feeds a paper placed in a paper placing tray, comprising: a paper feeding roller that feeds a paper; a separating member that separates a paper fed by the paper feeding roller one by one; a support member that supports the separating member to be abutted onto the paper feeding roller with a predetermined pressure and has an accommodating portion; and a weight member that is accommodated within the accommodating potion in a movable state.

In the fifth invention, the paper feed apparatus is an apparatus that feeds a paper placed in the paper placing tray, and is used in an image forming apparatus such as a copying machine, a facsimile, a printer, a multifunction machine compounding these, etc. The paper feed apparatus comprises the feed roller and the separating member for separating a paper one by one and feeding the paper. The separating member is a separating pad etc., and is supported by the support member to be abutted onto the paper feeding roller with the predetermined pressure. The accommodating portion is formed in the support member. Then, the weight member is accommodated in the accommodating portion in a state where there is a room leaving a part of an internal volume, and therefore, the weight member is brought into a state where the weight member can move (minute-vibrate) in a direction of a minute vibration of separating member within the accommodating portion.

In such the paper feed apparatus, even if the separating member and the support member minute-vibrate at the time of paper feeding, the minute vibration of separating member can be attenuated promptly since the weight member is moved out of synchronization with the support member. Furthermore, since it does not perform making the separating member into a low frictional resistance or decreasing an abutting pressure of the separating member against the paper feeding roller in order to suppress the minute vibration of separating member, paper separation and feeding performance by the paper feeding roller and the separating member does not fall.

According to the fifth invention, it is possible to adequately suppress the minute vibration of the separating member and the sound accompanying the minute vibration while keeping the paper separation and feeding performance with simple structure of accommodating the weight member in a movable state within the accommodating portion.

A sixth invention is according to the fifth invention, wherein the weight member is constituted with a plurality of granular bodies.

In the sixth invention, a plurality of granular bodies such as iron powder are used as the weight member.

A seventh invention is an image forming apparatus comprising the paper feed apparatus according to the first invention.

According to the seventh invention, the same action and effect as those of the first invention can be effectuated, and it is possible to adequately suppress the minute vibration of separating member and the sound accompanying it.

An eighth invention is an image forming apparatus comprising the paper feed apparatus according to the fifth invention.

According to the eighth invention, the same action and effect as those of the first invention can be effectuated, and it is possible to adequately suppress the minute vibration of separating member and the sound accompanying it.

The above described objects and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

[First Embodiment]

Figure 1:
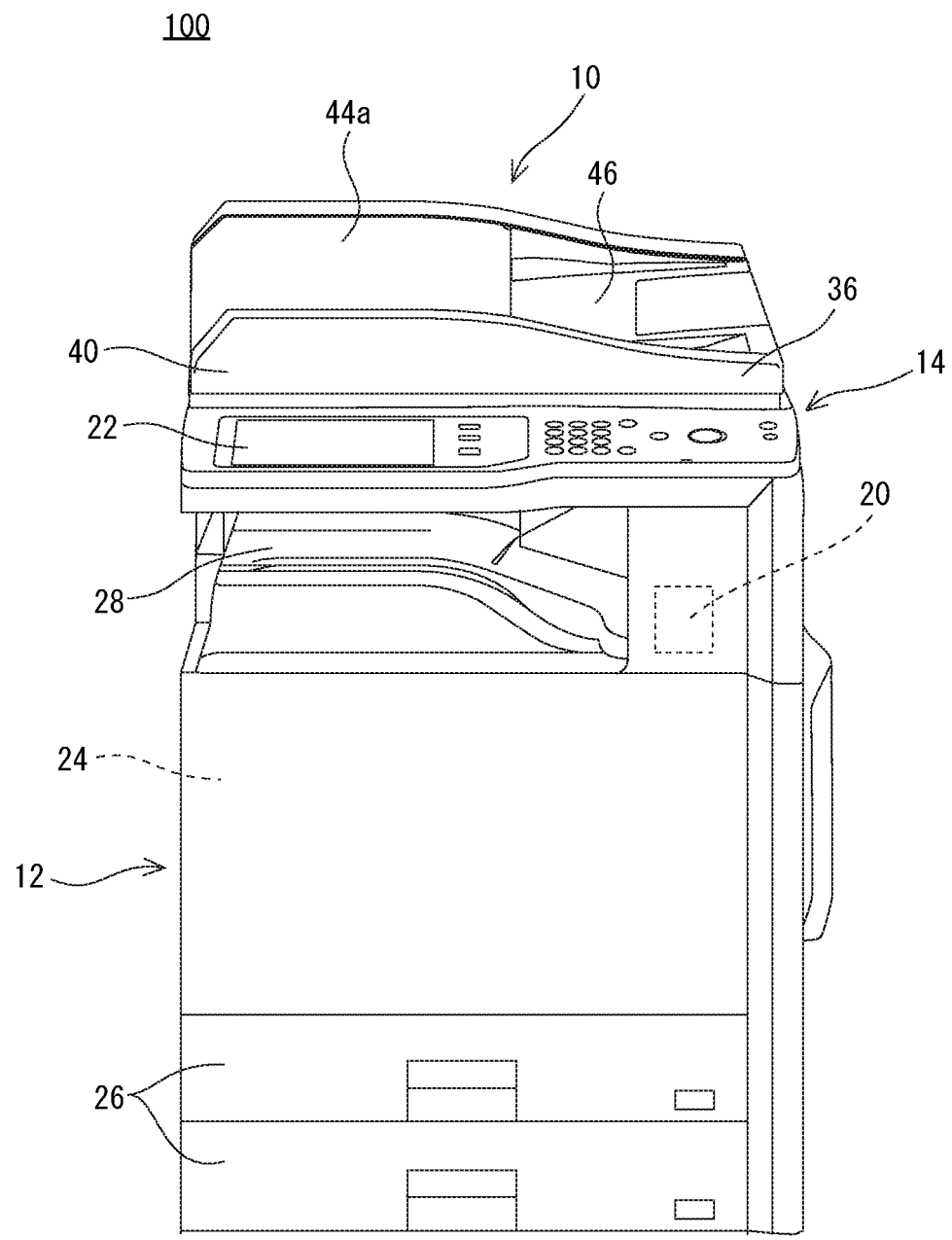
FIG. 1 is an illustration view showing an appearance of an image forming apparatus comprising a paper feed apparatus that is a first embodiment according to the present invention.
Figure 2:
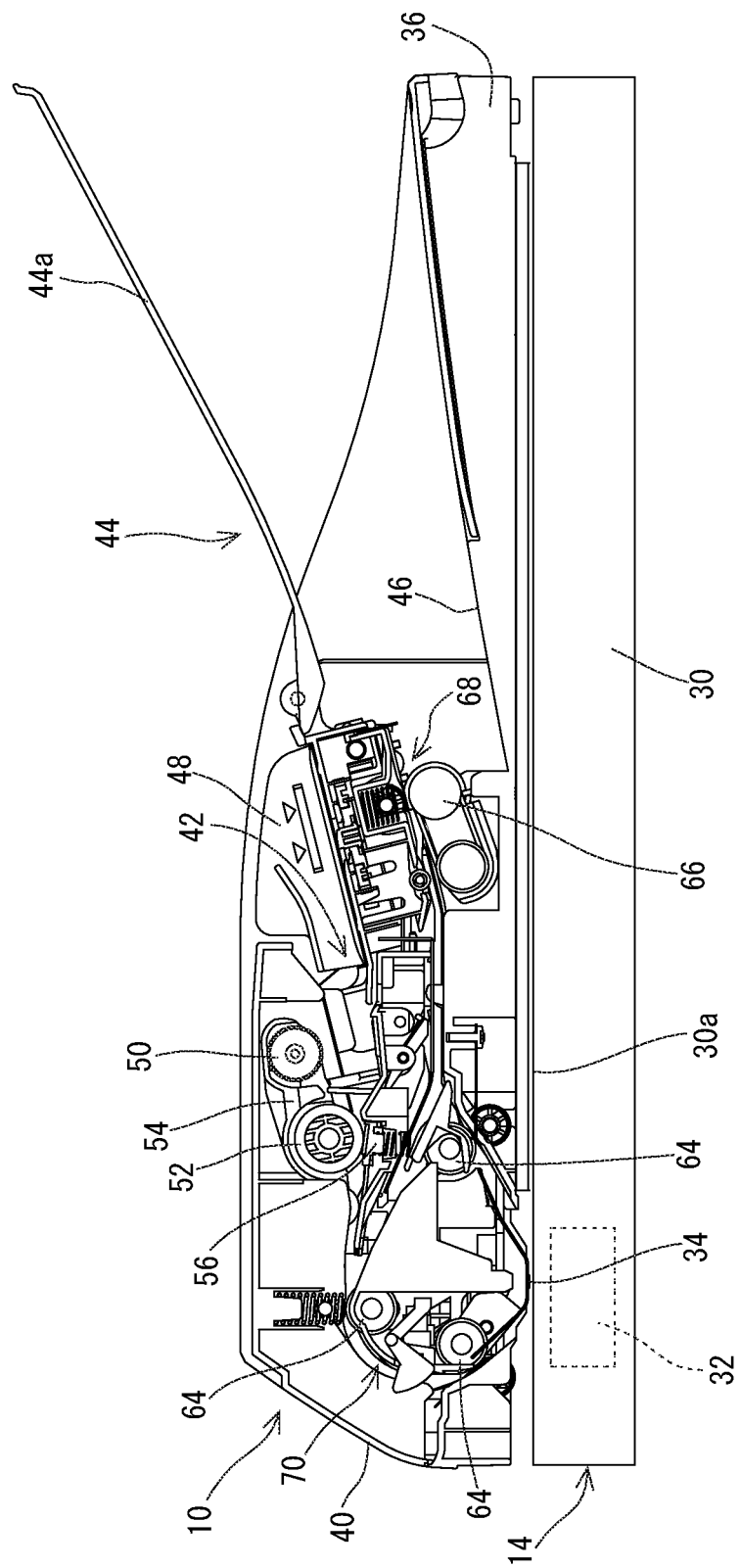
FIG. 2 is a schematic cross-sectional view showing internal structure of the paper feed apparatus of FIG. 1.
Figure 3:
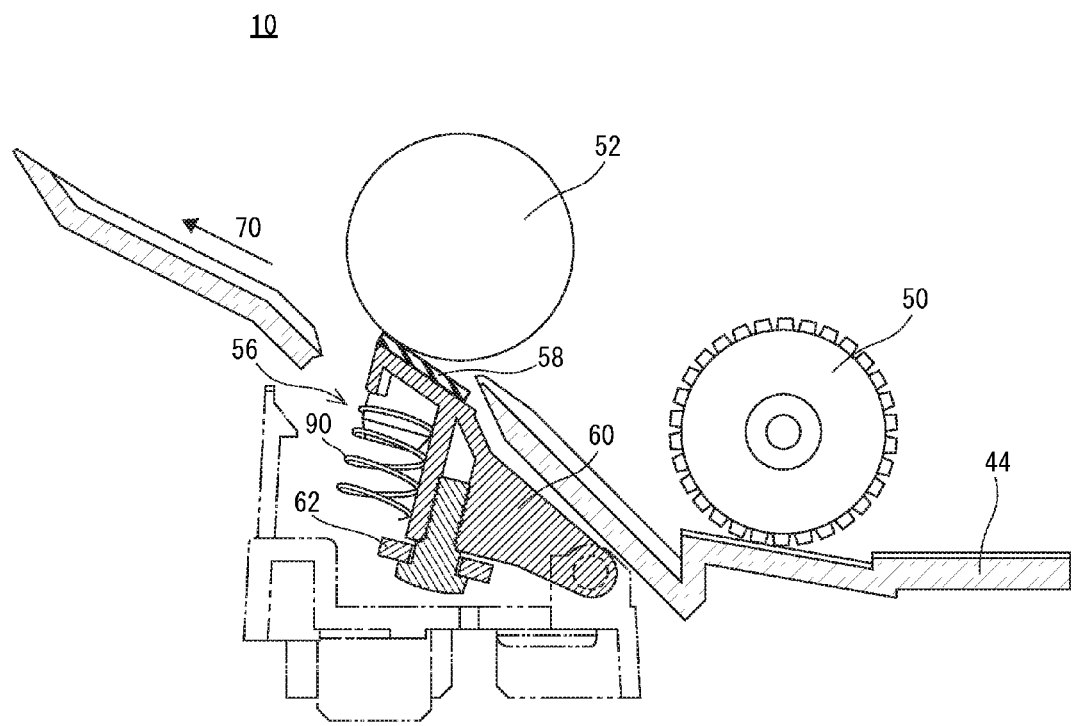
FIG. 3 is a schematic cross-sectional view showing structure of a periphery of a separation unit of the paper feed apparatus of FIG. 1.
Figure 4:
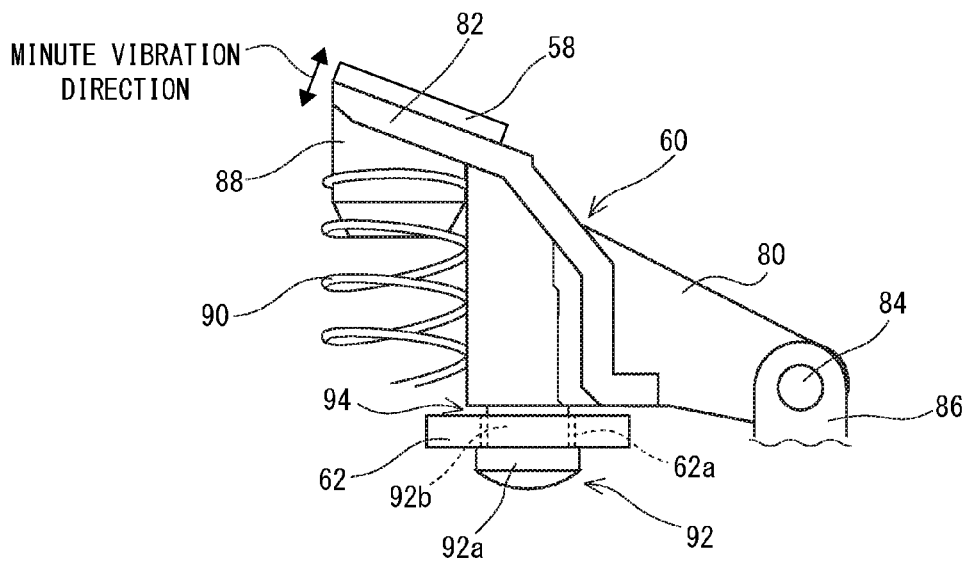
FIG. 4 is a front view showing the separation unit that is provided in the paper feed apparatus of FIG. 1.
Figure 5:
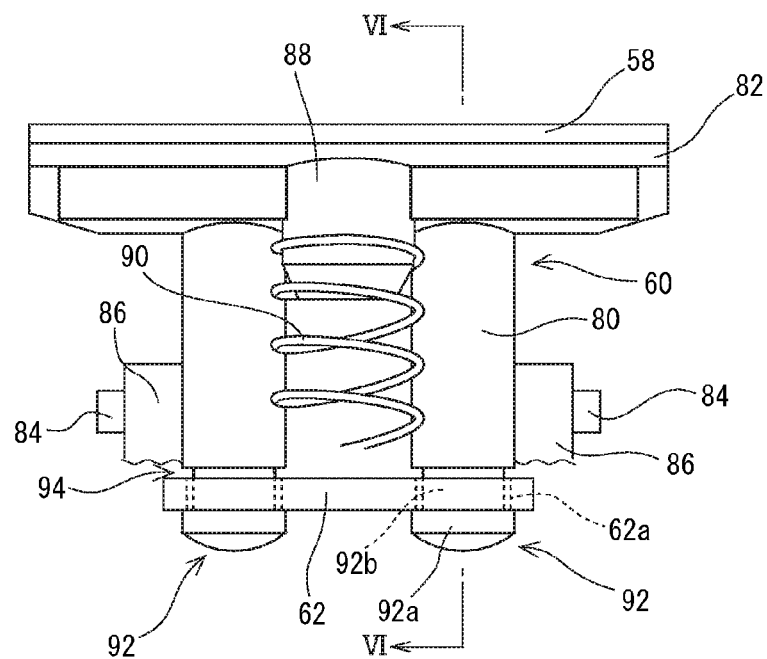
FIG. 5 is a side view showing the separation unit of FIG. 4.
Figure 6:
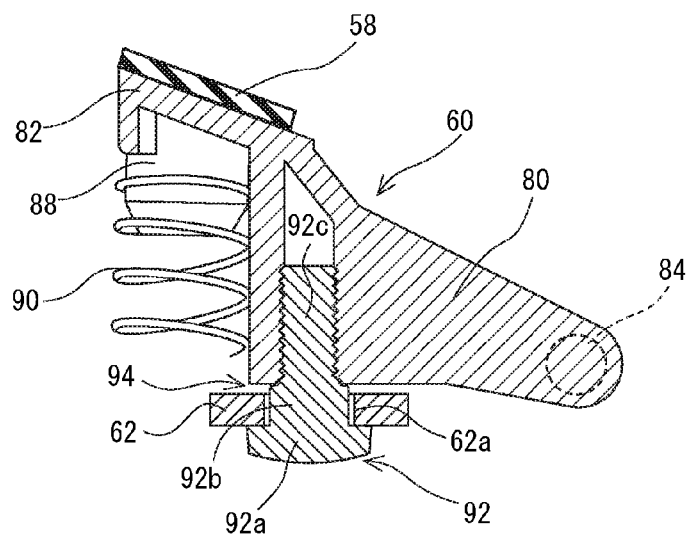
FIG. 6 is a cross-sectional view showing a cross-section of the separation unit at a line of VI-VI in FIG. 5.
Figure 7:
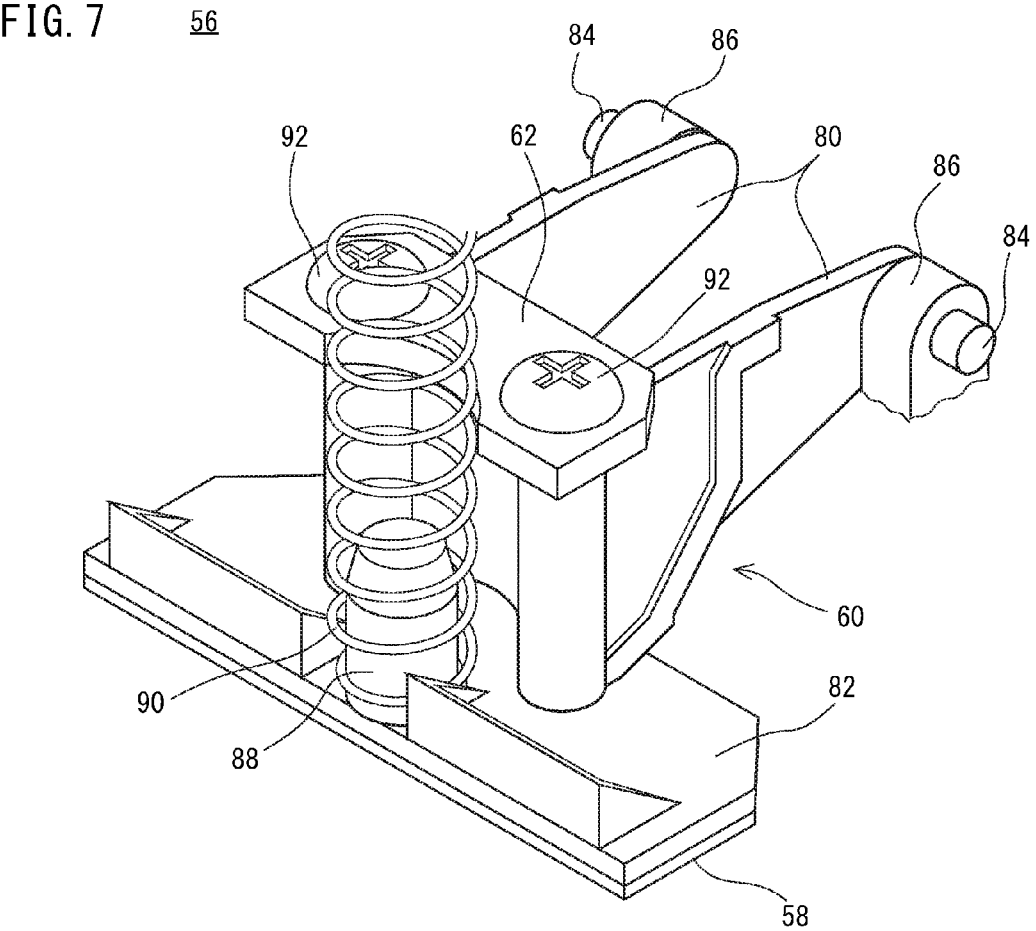
FIG. 7 is a perspective view showing a bottom side of the separation unit of FIG. 4.

With referring to FIG. 1 and FIG. 2, a paper feed apparatus 10 that is one embodiment according to the present invention is used in an image forming apparatus such as a copying machine, a facsimile, a printer, a multi-function machine compounding these, etc. As details will be described later, the paper feed apparatus 10 comprises a paper feeding roller 52, a separation unit 56, etc., and feeds an original (paper) placed in an original placing tray (paper placing tray) 44 to an image reading position 34 one by one. In this embodiment, an example that the paper feed apparatus 10 is applied to a multifunction machine 100 having a copying machine function, a printer function, a scanner function, a facsimile function, etc. is shown.

First, structure of the multifunction machine 100 is roughly described. As shown in FIG. 1 and FIG. 2, the multifunction machine 100 includes the paper feed apparatus 10, a multifunction machine body 12 and an image reading apparatus 14. A control portion 20 that controls operations of respective components of the multifunction machine 100 is provided in a predetermined position in the multifunction machine body 12. The control portion 20 comprises a CPU, memories, etc., and transmits control signals according to an input operation to an operating portion 22 by a touch panel, operating button, etc. to respective components of the multifunction machine 100 to make the multifunction machine 100 perform a various kinds of operations.

Furthermore, an image forming portion 24 that is provided with a photoreceptor drum, a charging apparatus, an exposure apparatus, a developing apparatus, a transfer apparatus, a fixing apparatus, etc. is incorporated within the multifunction machine body 12. The image forming portion 24 forms an image on a recording paper that is fed from a paper cassette 26 or the like by an electrophotography system, and discharges the recording paper on which the image has been formed onto a discharging tray 28. As image data for forming an image on the recording paper, image data that is read by an image reading portion 32 of the image reading apparatus 14, image data that is transmitted by an external computer, etc. can be utilized.

The image reading apparatus 14 comprises a housing 30 that has an original platen 30a made of a transparent material on a top surface thereof. Within the housing 30, there is provided with the image reading portion 32 that comprises a light source, a plurality of mirrors, a focusing lens, a line sensor, etc. In the image reading portion 32, an original surface is exposed by the light source, and a reflected light that is reflected by the original surface is conducted to the focusing lens by the plurality of mirrors. Then, the reflected light is focused onto photoreceptors of the line sensor by the focusing lens. In the line sensor, a luminance and a chromaticity of the reflected light being focused onto the photoreceptors are detected to produce image data based on the image of the original surface. As the line sensor, a CCD (Charge Coupled Device), a CIS (Contact Image Sensor) or the like can be used.

In addition, the image reading portion 32 has a home position at a position opposite to an image reading position 34, and in a case where an image of an original placed in the original placing tray 44 is to be read, the image reading portion 32 reads an image on the original surface when the original passes the image reading position 34, thereby to acquire image data. Furthermore, in a case where an image of an original that is put on the original platen 30a on the top surface of the housing 30 is to be read, by adequately moving the light source, mirrors, etc. beneath the original platen 30a, an image of the original is read, thereby to acquire image data.

In addition, a platen cover 36 is attached to the original platen 30a of the image reading apparatus 14 in an openable/closable manner via a hinge. The paper feed apparatus 10 is provided on the platen cover 36.

In the following, structure of the paper feed apparatus 10 will be specifically described by suitably referring to FIG. 2 to FIG. 7. In addition, it should be noted that a term "upstream" or "downstream" means, in this specification, an upstream or a downstream in an original feeding direction (paper feeding direction).

As shown in FIG. 2, the paper feed apparatus 10 is an automatic document feeder (ADF) that successively feeds an original that an image thereon is to be read from the original placing tray 44 to the paper discharging tray 46 via the image reading position 34, and is provided with a main body casing 40 that is made of a synthetic resin and forms an outer shell. A paper feeding port 42 is formed in an upper portion of the main body casing 40 and the original placing tray 44 is provided so as to extend from the paper feeding port 42 obliquely upward. The original placing tray 44 includes a tabular rotating portion 44a that is provided in a rotatable manner, the paper feeding port 42 is opened or closed by rotating the rotating portion 44a. Furthermore, a pair of side guides 48 that are movable in a width direction are provided on an upper surface of the original placing tray 44. The side guides 48 regulate and align the original that is placed in the original placing tray 44 from both sides.

In the main body casing 40, a pickup roller 50 that picks-up an original placed in the original placing tray 44 is provided to be movable upward and downward. In a downstream side of the pickup roller 50, there is provided with a paper feeding roller 52 that feeds-out the original that is picked-up from the original placing tray 44 by the pickup roller 50. A pickup holder 54 is provided so as to cover peripheries and upper parts of the pickup roller 50 and the paper feeding roller 52. The pickup roller 50 is supported by the pickup holder 56 to be movable upward and downward around the rotation shaft of the paper feeding roller 52.

Furthermore, the separation unit 56 for preventing a multi-feed of an original is provided in a position opposite to the paper feeding roller 52. As details will be described later, the separation unit 56 comprises a separating pad 58 that is a separating member that separates an original fed-out by the paper feeding roller 52 one by one, a separating pad holder 60 that is a support member that supports the separating pad 58, a weight member 62, etc.

Furthermore, in a downstream side of the paper feeding roller 52, a plurality of feeding rollers 64 and a paper discharging roller 66 are provided, and within the main body casing 40, an original feeding path 70 that extends from the paper feeding port 42 to a paper discharging port 68 via the image reading position 34 is formed. The original fed-out by the paper feeding roller 52 to an original feeding path 70 is fed by the plurality of feeding rollers 64 to the image reading position 34. Then, an image is read by the image reading portion 32 of the image reading apparatus 14 while the original is being fed above the image reading position 34. The original that is passed through the image reading position 34 is guided to the paper discharging port 68 by the feeding rollers 64 and the paper discharging roller 66, and is discharged onto the paper discharging tray 46.

Subsequently, structure of the separation unit 56 will be described specifically. As shown in FIG. 3-FIG. 7, the separation unit 56 comprises the separating pad 58 and separating pad holder 60, etc.

The separating pad 58 is a member that has a shape of a rectangle plate, and is formed of a material having a high coefficient of friction such as a urethane resin etc. The separating pad 58 is supported by the separating pad holder 60 to be abutted onto the paper feeding roller 52 with a predetermined pressure.

The separating pad holder 60 is formed of a synthetic resin etc., and comprises an arm portion 80 extending in the original feeding direction. A tabular pad attaching portion 82 having an upper surface to which the separating pad 58 is secured is formed in a downstream side end of the arm portion 80. Furthermore, a support shaft 84 is formed in an upstream side end of the arm portion 80, that is, in a position deviated from the separating pad 58 to an upstream side. The support shaft 84 is supported by a bearing 86 rotatably, and the separating pad holder 60 is made to be rockable with the support shaft 84 as a fulcrum. Furthermore, a spring attaching portion 88 having a shape of an approximately cylinder is formed on a lower surface of the pad attaching portion 82. An elastic member such as a compression spring 90 is attached to the spring attaching portion 88. Then, an upper surface of the separating pad 58 is abutted onto an outer peripheral surface of the paper feeding roller 52 with a predetermined pressure by pushing up a downstream side end of the separating pad holder 60 by the compression spring 90, whereby a nip portion for paper-separation and feeding is formed between the separating pad 58 and the paper feeding roller 52.

Furthermore, the separating pad 58 is made such that a coefficient of friction of an upper surface with the original is smaller than a coefficient of friction of the outer peripheral surface of the paper feeding roller 52 with the original, but larger than a coefficient of friction between originals with each other. Accordingly, an original can be separated one by one in the nip portion formed by the separating pad 58 and the paper feeding roller 52, and the original is fed-out to the original feeding path 70 sequentially.

In the paper feed apparatus 10 comprising such the separation unit 56, if the paper feeding roller 52 rotates at the time of paper feeding, when the separating pad 58 and the original or the paper feeding roller 52 rub, a minute vibration may occur on the separating pad 58 and the separating pad holder 60. At this time, since the separating pad holder 60 is supported with the support shaft 84 as a fulcrum in a rockable manner, a minute vibration of the separating pad 58 and the separating pad holder 60 (hereinafter, called "minute vibration of separating pad 58 etc.") occurs in a rocking direction of the separating pad holder 60, that is, an abutting direction of the paper feeding roller 52 and the separating pad 58. Especially, since a frictional resistance becomes high when the separating pad 58 and the paper feeding roller 52 rub directly, the minute vibration of separating pad 58 etc. is amplified, and therefore, an abutting state of the separating pad 58 to the paper feeding roller 52 becomes unstable, and accordingly, a possibility that a sound (vibration sound) may occur also becomes high.

Then, in this first embodiment, it is intended that by attaching the weight member 62 to the separating pad holder 60 in a loosely-fitted state, the minute vibration of separating pad 58 etc. is suppressed, thereby to reduce a noise. In addition, "loosely-fitting" or "loosely-fitted" means fitting of two members in a state where a play is secured, that is, a state where some gap is formed, and further means in a manner that one member can move apart from the other member.

Briefly describing, the separating pad holder 60 is provided with a loosely-fitting shaft that is a shape of short cylinder extending in a direction the same or approximately the same as a direction of the minute vibration of separating pad 58 etc., and two engaging portions are provided at a predetermined interval in an axial direction of the loosely-fitting shaft. On the other hand, the weight member 62 is formed with a loosely-fitting hole into which the loosely-fitting shaft of the separating pad holder 60 is inserted. In addition, a diameter of the loosely-fitting shaft of the separating pad holder 60 is set to be slightly smaller than a diameter of the loosely-fitting hole of the weight member 62. Furthermore, a distance between the engaging portions of the separating pad holder 60 is set slightly larger than a thickness of the weight member 62. Then, by fitting the loosely-fitting shaft and the loosely-fitting hole to each other between the two engaging portions, the weight member 62 is attached to the separating pad holder 60 in the loosely-fitted state, and therefore, it is brought into a state where the weight member 62 can move (minute-vibrate) to the axial direction of the loosely-fitting shaft.

In this first embodiment, the loosely-fitting shaft and the two engaging portions of the separating pad holder 60 are provided using shoulder bolts 92. Specifically, two threaded holes that are aligned with each other at a predetermined interval in a direction orthogonally intersecting the original feeding direction are formed in the downstream side end of the arm portion 80 of the separating pad holder 60 so as to sandwich the spring attaching portion 88. The two threaded holes are formed so as to extend a direction the same or approximately the same as the direction of the minute vibration of separating pad 58, and opened downwardly. Then, the shoulder bolts 92 are screwed into these two threaded holes, respectively. The shoulder bolt 92 has a head portion 92a, a base portion 92b that has a diameter smaller than that of the head portion 92a and an outer periphery surface being not threaded, and a screw portion 92c that has a diameter smaller than that of the base portion 92b. By tightening the shoulder bolts 92 into the threaded holes formed on the arm portion 80 till the last, the loosely-fitting shaft of a length according to an axial length of the base portion 92b is formed so as to project from the arm portion 80 downward. That is, in this first embodiment, the base portions 92b of the shoulder bolts 92 function as the loosely-fitting shafts, and the upper surface of the head portions 92a of the shoulder bolts 92 and the lower surface of the arm portion 80 function as the two engaging portions.

On the other hand, the weight member 62 is formed of metal such as iron in a plate shape. This weight member 62 is formed with the loosely-fitting holes 62a for being inserted with the base portions (loosely-fitting shafts) 92b in positions corresponding to the base portions 92b of the shoulder bolts 92, respectively. The weight member 62 is attached to the separating pad holder 60 so as to couple the base portions 92b to each other.

At this time, a diameter of the loosely-fitting hole 62a is set to be slightly larger than the diameter of the base portion 92b. Furthermore, a thickness of the weight member 62 is set to be slightly smaller than an axial length of the base portion 92b, that is, a distance between the upper surface of the head portion 92a of the shoulder bolt 92 and the lower surface of the arm portion 80. Accordingly, when the weight member 62 is attached to the separating pad holder 60, the weight member 62 will be in a loosely-fitted state, and a gap 94 is formed between the upper surface of the weight member 62 and the lower surface of the arm portion 80. A size of this gap 94, that is, a difference of a distance between the two engaging portions and the thickness of the weight member 62 is set as 0.1-0.3 millimeters, for example. Furthermore, a weight of the weight member 62 is set as 1 gram or more, for example.

When using such the separation unit 56, even if the separating pad 58 etc. minute-vibrate at the time of paper feeding, the weight member 62 in the loosely-fitted state to the separating pad holder 60 moves out of synchronization with the separating pad holder 60 without following immediately due to inertia. Accordingly, since the weight member 62 gives a load of an opposite direction to the minute vibration of separating pad 58 etc., the minute vibration of separating pad 58 etc. can be reduced promptly. That is, since the weight member 62 minute-vibrates slightly out of synchronization with the minute vibration of separating pad 58 etc. without resonating with it, the minute vibration of separating pad 58 etc. is absorbed and thus attenuated promptly.

Furthermore, since a resonance point of the separating pad 58 etc. to the paper feeding roller 52 can be shifted by providing the weight member 62 to the separating pad holder 60, the minute vibration of separating pad 58 etc. can be suppressed.

Furthermore, the minute vibration of separating pad 58 etc. can be suppressed only by providing the weight member 62 in the loosely-fitted state, and therefore, it is not necessary to make the separating pad 58 into a low frictional resistance or drop the abutting pressure (nip pressure) of the separating pad 58 to the paper feeding roller 52 in order to suppress the minute vibration of separating pad 58 etc., no fall occurs in the separation and feeding performance of the paper by the paper feeding roller 52 and the separating pad 58.

In addition, although not limited in particular, it is preferable that an arranging position of the weight member 62 to the separating pad holder 60 is located in a position near the separating pad 58 than the support shaft 84 of the separating pad holder 60 in the original feeding direction, that is, in a position far from the support shaft 84. It is because the minute vibration suppression effect by the weight member 62 is shown more largely by this.

As described above, according to this first embodiment, it is possible to adequately suppress the minute vibration of separating member 58 etc. and the sound accompanying the minute vibration while keeping the paper separation and feeding performance with simple structure of providing the weight member 62 in a loosely-fitted state to the separating pad holder 60.

[Second Embodiment]

Figure 8:
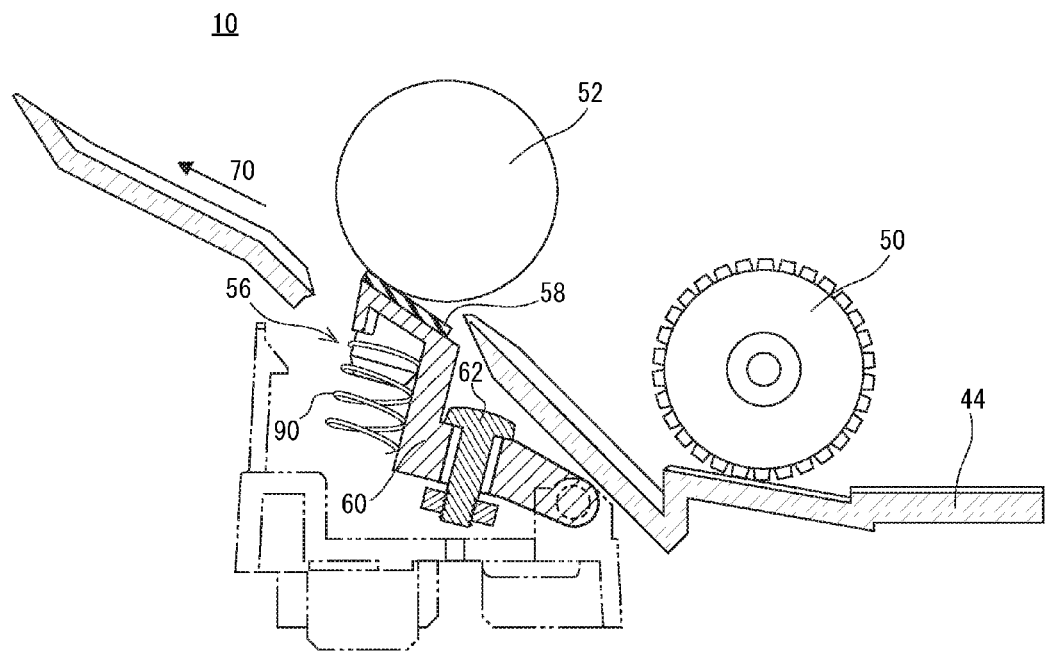
FIG. 8 is a schematic cross-sectional view showing structure of a periphery of a separation unit of a paper feed apparatus that is a second embodiment according to the present invention.
Figure 9:
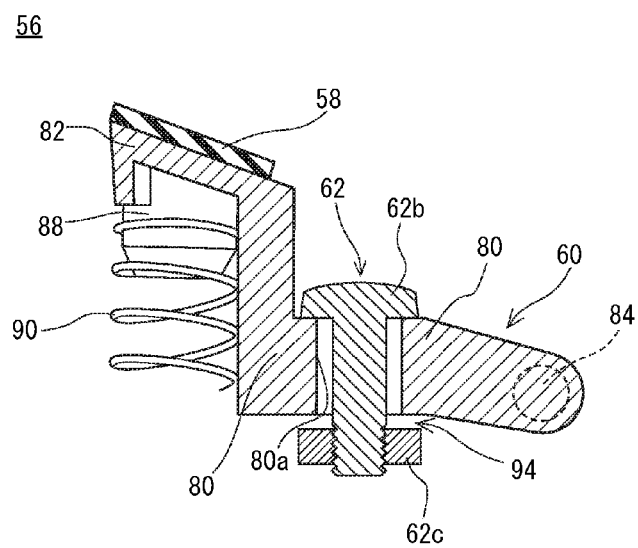
FIG. 9 is a cross-sectional view showing the separation unit of FIG. 8.

Next, with reference to FIG. 8 and FIG. 9, a paper feed apparatus 10 that is the second embodiment of the present invention will be described. This second embodiment differs from the above-described first embodiment in a point of using a shaft member that is loosely fitted into a loosely-fitting hole as the weight member 62. Since structure of remaining portions is the same or similar to that of the above-described first embodiment, a duplicate description will be omitted or simplified while applying the same reference numerals to the portions being common in the above-described first embodiment.

Briefly describing, in the second embodiment, a loosely-fitting hole that extends in the same or approximately the same direction as a direction of the minute vibration of separating pad 58 etc. is formed on the separating pad holder 60. On the other hand, the weight member 62 is provided with loosely-fitting shaft that is inserted into the loosely-fitting hole of the separating pad holder 60. On this loosely-fitting shaft, two engaging portions are provided at a predetermined interval in an axial direction. A diameter of the loosely-fitting shaft of the weight member 62 is set to be slightly smaller than a diameter of the loosely-fitting hole of the separating pad holder 60. Furthermore, a distance between the engaging portions of the weight member 62 is set to be slightly longer than an axial length of the loosely-fitting hole of the separating pad holder 60. Then, by fitting the loosely-fitting shaft and the loosely-fitting hole between the two engaging portions, the weight member 62 is attached to the separating pad holder 60 in a loosely-fitted state, and therefore, it is brought into a state where the weight member 62 can move (minute-vibrate) to the axial direction of the loosely-fitting hole. In addition, it is preferable that an arranging position of the weight member 62 to the separating pad holder 60 is located in a position near the separating pad 58 than the support shaft 84 of the separating pad holder 60 in an original feeding direction.

The weight member 62 is constituted by a bolt 62b and a nut 62c in this second embodiment. The bolt 62b has a head portion and a shaft portion, and only a tip end portion of the shaft portion is threaded. Then, the nut 62c is screwed to the tip end portion of this shaft portion. That is, in this second embodiment, the shaft portion of the bolt 62b functions as a loosely-fitting shaft, and a lower surface of the head portion of the bolt 62b and an upper surface of the nut 62c function as two engaging portions.

On the other hand, a single loosely-fitting hole 80a is formed in a downstream side end of the arm portion 80 of the separating pad holder 60 in a center portion in a direction orthogonally intersecting the original feeding direction. At this time, a diameter of the loosely-fitting hole 80a is set to be slightly larger than a diameter of the shaft portion of the bolt 62b. Furthermore, an axial direction length of the loosely-fitting hole 80a is set to be slightly shorter than a distance between the lower surface of the head portion of the bolt 62b and the upper surface of the nut 62c. Accordingly, when the weight member 62 is attached to the separating pad holder 60, the weight member 62 will be in a loosely-fitted state, and a gap 94 is formed between the lower surface of the arm portion 80 and the upper surface of the nut 62c.

In also this second embodiment, as similar to the first embodiment, it is possible to adequately suppress the minute vibration of separating member 58 etc. and the sound accompanying the minute vibration while keeping the paper separation and feeding performance with simple structure of providing the weight member 62 in a loosely-fitted state to the separating pad holder 60.

[Third Embodiment]

Figure 10:
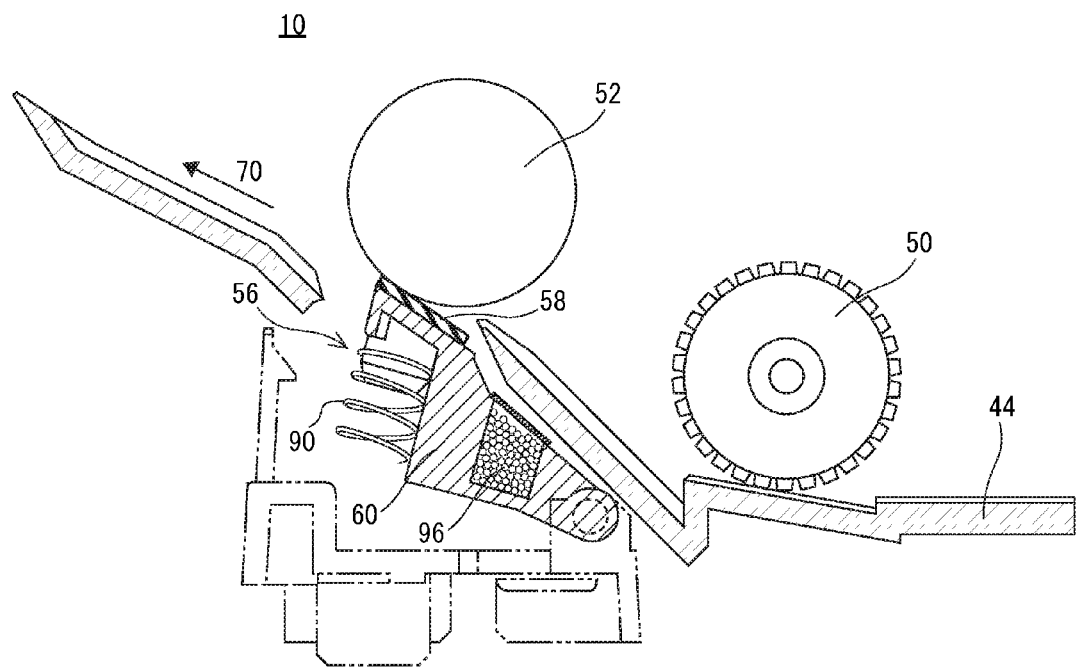
FIG. 10 is a schematic cross-sectional view showing structure of a periphery of a separation unit of a paper feed apparatus that is a third embodiment according to the present invention.
Figure 11:
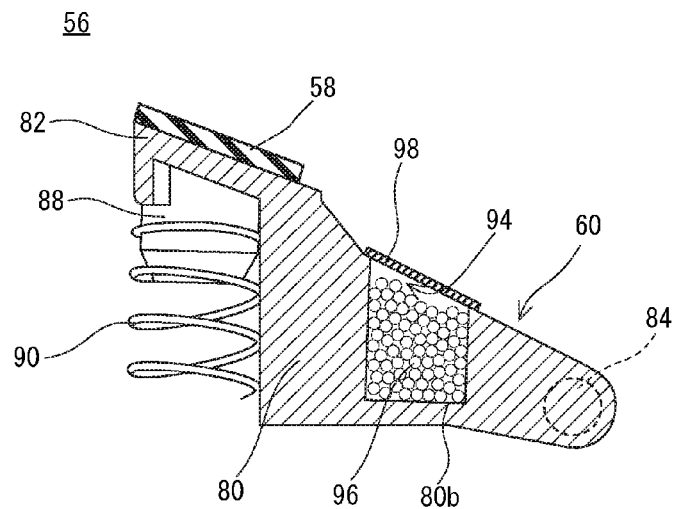
FIG. 11 is a cross-sectional view showing the separation unit of FIG. 10.

Next, with reference to FIG. 10 and FIG. 11, a paper feed apparatus 10 that is the third embodiment of the present invention will be described. This third embodiment differs from the above-described first embodiment in a point of using a plurality of granular bodies as a weight member 96. Since structure of remaining portions is the same or similar to that of the above-described first embodiment, a duplicate description will be omitted or simplified while applying the same reference numerals to the portions being common in the above-described first embodiment.

Briefly describing, in the third embodiment, metallic granular bodies such as iron powder will be used as the weight member 96, and this weight member 96 is accommodated in an accommodating portion 80b that is formed on the arm portion 80 of the separating pad holder 60. An opening of this accommodating portion 80b is suitably sealed by a seal member 98. At this time, the weight member 96 is brought into a state capable of moving in an inside of the accommodating portion 80b (capable of minute-vibrating) by being accommodated in a state where there is a room leaving a part of an internal volume of the accommodating portion 80b, that is, a state where there is a gap 94. In addition, it is preferable that an arranging position of the weight member 96 to the separating pad holder 60 is located in a position near the separating pad 58 than the support shaft 84 of the separating pad holder 60 in an original feeding direction.

In also the third embodiment, even if the separating pad 58 etc. minute-vibrate at the time of paper feeding, since the weight member 96 moves out of synchronization with the separating pad holder 60 without following immediately due to inertia, the minute vibration of separating pad 58 etc. can be absorbed and attenuated promptly.

Accordingly, in the third embodiment, it is possible to adequately suppress the minute vibration of separating member 58 etc. and the sound accompanying the minute vibration while keeping the paper separation and feeding performance with simple structure of accommodating the weight member 96 within the accommodating portion 80b of the separating pad holder 60 in a movable state.

In addition, in the above described third embodiment, although the weight member 96 is directly accommodated in the accommodating portion 80b that is formed on the separating pad holder 60, not limited to this. For example, it is thinkable that the weight member 96 is sealed into a container in a state capable of moving, and the weight member 96 is embed in the separating pad holder 60 together with the container. Furthermore, the weight member 96 is not necessarily needed to be constituted by a plurality of granular bodies, and may be constituted as a single lump.

In addition, although the tabular separating pad 58 is used as a separating member in each of the above-described embodiments, the separating member may be a separating roller etc. formed in a shape of roller.

Furthermore, in each of the above-described embodiments, although the separating pad holder 60 is provided with the support shaft 84 that is provided in a position deviated from the separating pad 58 to the upstream side, the support shaft 84 may be provided in a position deviated from the separating pad 58 to the downstream side. Furthermore, the separating pad holder 60 is not necessarily needed to be made rockable (rotatable) with the support shaft 84 that is provided in a position that is deviated from the separating pad 58 to the upstream side or the downstream side as a fulcrum. For example, it is possible to provide the separating pad holder 60 in an opposite position to the paper feeding roller 52 such that the separating pad holder 60 can move reciprocately linearly against an abutting direction of the paper feeding roller 52 and the separating pad 58.

Furthermore, although the paper feed apparatus 10 is applied to an automatic document feeder to feed a paper (original) that an image is to be read in each of the above-described embodiments, not limited to this. For example, the paper feed apparatus 10 is applicable also to a mechanism that feeds a paper (recording paper) on which an image is to be printed from a paper placing tray such as a manual paper feeding tray, a paper feeding cassette, etc. to the image forming portion 24.

Furthermore, although the paper feed apparatus 10 is also applied to the multifunction machine (image forming apparatus) 100 that the main body 12 comprising the image forming portion 24 and the image reading apparatus 14 are integrated in each of the above-described embodiments, not limited to this. For example, the image reading apparatus 14 comprising the paper feed apparatus 10 may be made as an individual product. In this case, the image reading apparatus 14 is connected to a network and transmits an image having been read to a personal computer, another image forming apparatus, etc., for example.

In addition, the above-described specific numerals of sizes and shapes and the number of pieces of the weight members 62 and 96, etc. are all mere example, and these are changeable according to necessity such as specification of product.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A paper feed apparatus that feeds a paper placed in a paper placing tray, comprising:
   a paper feeding roller that feeds a paper;
   a separating member that separates a paper fed by the paper feeding roller one by one;
   a support member that supports the separating member to be abutted onto the paper feeding roller with a predetermined pressure; and
   a weight member that is provided to the support member in a loosely-fitted state,
   wherein the support member has a loosely-fitting shaft, and the weight member has a loosely-fitting hole into which the loosely-fitting shaft is inserted,
   further comprising engaging portions that are provided on the support member and the loosely-fitting shaft, respectively, at a predetermined interval in an axial direction of the loosely-fitting shaft,
   wherein the weight member is attached to the loosely-fitting shaft movably between the engaging portions.

2. The paper feed apparatus according to the claim 1, wherein the support member is provided in a rockable manner with a support shaft that is provided in a position deviated from the separating member to an upstream side or a downstream side in a paper feeding direction as a fulcrum, and the weight member is arranged in a position near the separating member than the support shaft in the paper feeding direction.

3. An image forming apparatus comprising the paper feed apparatus according to the claim 1.

4. The paper feed apparatus according to the claim 1, wherein a thickness of the weight member is set smaller than a distance between the engaging portions.

* * * * *